United States Patent [19]
Grabb et al.

[11] 3,937,126
[45] Feb. 10, 1976

[54] REACTION HOLD-OFF MEANS FOR A TWO STAGE SERVOMOTOR

[75] Inventors: Frederick G. Grabb; Carl D. Owens; Delbert J. Gardner, all of South Bend, Ind.

[73] Assignee: The Bendix Corporation, South Bend, Ind.

[22] Filed: Mar. 29, 1974

[21] Appl. No.: 456,347

[52] U.S. Cl. ............................ 91/6; 60/404; 251/77
[51] Int. Cl.² .................... F01B 25/02; F15B 9/00
[58] Field of Search .......... 91/6, 31, 32, 33; 92/84; 251/77, 83, 82; 60/404

[56] References Cited
UNITED STATES PATENTS

| | | | |
|---|---|---|---|
| 3,174,285 | 3/1965 | Stelzer | 92/84 X |
| 3,434,388 | 3/1969 | Julow et al. | 91/6 |
| 3,661,054 | 5/1972 | Brown | 91/376 X |
| 3,719,044 | 3/1973 | Bach | 60/404 |
| 3,780,620 | 12/1973 | Gardner | 91/6 |

Primary Examiner—Irwin C. Cohen
Attorney, Agent, or Firm—Leo H. McCormick, Jr.; William N. Antonis

[57] ABSTRACT

A hold-off resilient member for resisting movement of a plunger caused by an input force. The plunger initially moves a first control valve to permit air to enter a servomotor and develop an operational pressure differential in response to the input force. Further movement of the plunger will axially compress the resilient member as a function of input force to output force causing its peripheral surface to radially expand and actuate a second control valve. The actuation of the second control valve will permit air above atmospheric pressure to develop the operational pressure differential in response to the input force.

7 Claims, 4 Drawing Figures

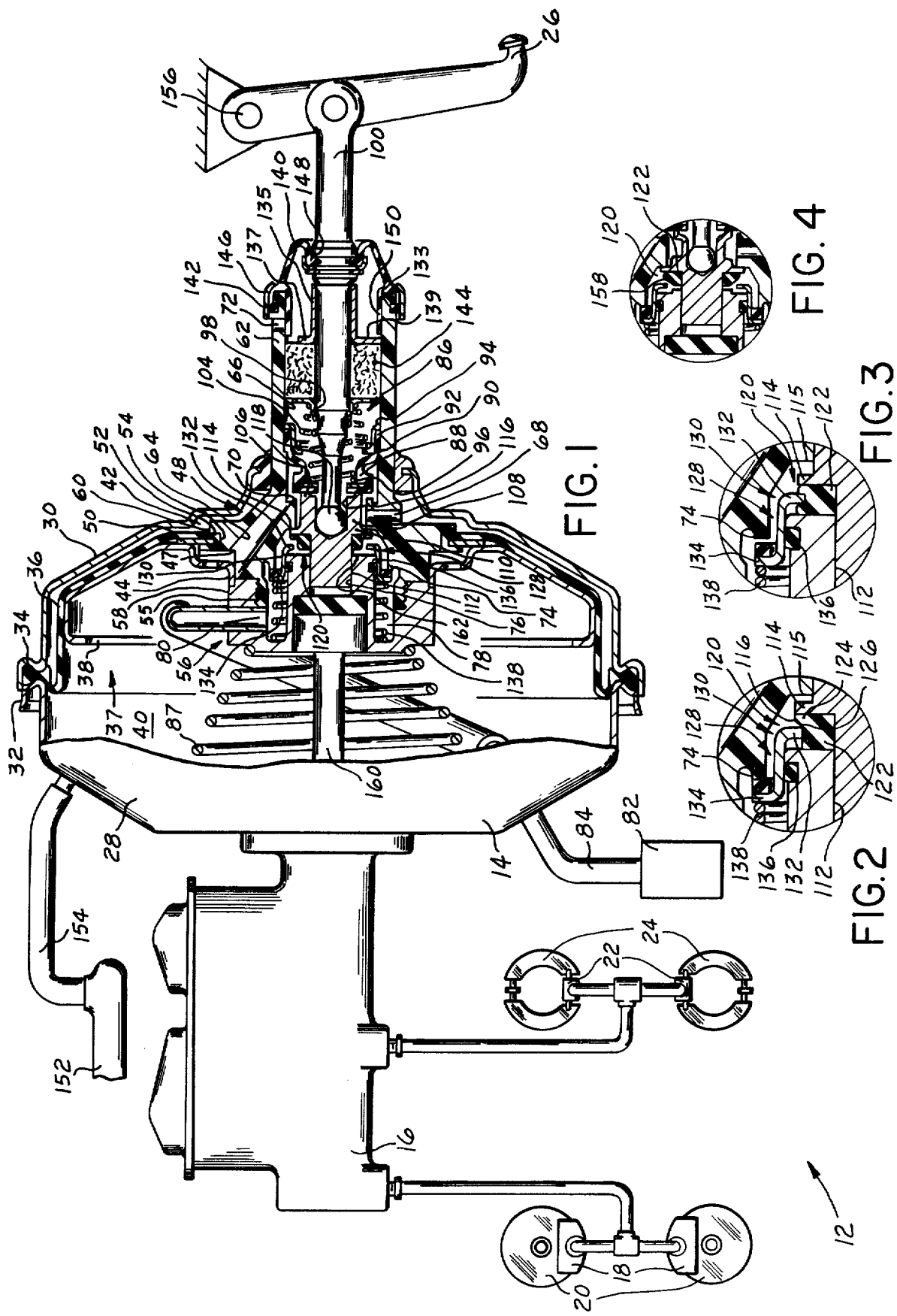

REACTION HOLD-OFF MEANS FOR A TWO STAGE SERVOMOTOR

BACKGROUND OF THE INVENTION

Car manufacturers in the United States are currently trying to reduce the overall weight of vehicles in an effort to increase the overall efficiency of fuel consumption at the same time safety bumpers, emission controls, roll bars and other safety features tend to nullify the other weight savings.

The emission controls have greatly reduced the production of vacuum at the intake manifold to an extent that the creation of an operational pressure differential with air at atmospheric pressure in a brake actuation servomotor can be insufficient to stop the vehicle.

In U.S. Pat. Re. No. 28,191, incorporated herein by reference, it is disclosed how air above atmospheric pressure and vacuum can be presented to a servomotor for the creation of an operational braking force. However, under test conditions it has been determined that air at atmospheric pressure and vacuum are present in a sufficient intensity to stop most vehicles during normal braking.

In U.S. Pat. No. 3,780,620, incorporated by reference, it is disclosed how a servomotor may be sequentially presented with air at atmospheric pressure and air above atmospheric pressure by a selected position actuated valve operated by engagement with a plunger. In this servomotor, the air above atmospheric pressure is directly communicated to the rear chamber. In the event that the valve is repeatedly oscillated by an operator within a short period of time, it is possible to deplete the source of vacuum and thereby eliminate the effectiveness of the sevomotor in a braking situation.

In U.S. application Ser. No. 428,495, now U.S. Pat. No. 3,880,049 incorporated herein by reference, it is disclosed how a control plunger may sequentially be positioned to operate a first valve and a second valve in response to an input force. With such a device, it is possible upon an initial application of an input force to bypass the first valve resulting in air above atmospheric pressure rapidly creating the operational pressure differential. However, during such a rapid pressure differential it is difficult to maintain a uniform braking force which provides a comfortable deceleration for most vehicle occupants.

SUMMARY OF THE INVENTION

We have devised a pressure differential servomotor having a plunger responsive to an input force for initially actuating a first control valve and later a second control valve to meet a greater braking demand. The servomotor has a first hub means wherein the first control valve means is located and a second hub means wherein the second control valve means is located. The plunger means has a guide surface located in the second hub means on which deformable resilient means is located. The deformable resilient means will provide a resistive force to the movement of the plunger by the input force by axially contracting while radially expanding. When the radial expansion reaches a predetermined dimension, the second valve means will be actuated to permit air above atmospheric pressure to create the operation pressure differential for the servomotor.

It is therefore an object of this invention to provide a servomotor with actuation control means whereby the development of pressure differential is initially regulated between air and vacuum by a first valve until the input force is equal to a predetermined function of the output force. This input force will be sufficient to radially expand a deformable resilient means which will actuate a second valve. With the second valve actuated, air above atmospheric pressure and vacuum can develop the pressure differential.

It is another object of this invention to provide a servomotor having a plunger means which actuates a plurality of control valves with hold-off means to sequentially control the actuation as a function of input force to output force.

It is a further object of this invention to provide a servomotor with a deformable resilient means whose axial and radial dimensional changes are proportional to input force with respect to output force, to actuate a control valve for supplying air above atmospheric pressure to create an operational pressure differential for a servomotor.

These and other objects will become apparent from reading this specification and viewing the drawings.

BRIEF DESCRIPTION OF THE DRAWING

FIG. 1 is a schematic illustration of a brake system having a servomotor with a hold-off means for regulating the operation of a control means which sequentially presents air at atmospheric pressure and air above atmospheric pressure for the creation of a pressure differential with vacuum to operate a brake actuator in response to an input force.

FIG. 2 is an enlarged segmental view of FIG. 1 showing the hold-off means for actuation of the valve which controls the air above atmospheric pressure.

FIG. 3 is an enlarged segmental view of FIG. 1 showing the air valve actuated by the deformation of the hold-off means.

FIG. 4 is an enlarged segmental view of another embodiment of a deformable hold-off means for actuating the air above atmospheric pressure control valve.

DETAILED DESCRIPTION OF THE PREFERRED EMBODIMENT

The vehicle braking system 12 shown in FIG. 1 consists of a servomotor 14 attached to a master cylinder 16 for supplying pressurized hydraulic fluid to wheel cylinders 18 of the front brakes 20 and to wheel cylinders 22 of the rear wheel brakes 24 in response to an operator input to brake pedal 26.

The servomotor 14 has a front shell 28 joined to a rear shell 30 by a twist lock connection 32. The twist lock connection 32 holds external bead 34 of diaphragm 36 in a sealed condition. The diaphragm 36 and backing plate 38 form a wall means 37 which separates the interior of the servomotor into a front chamber 40 and a rear chamber 42. The backing plate 38 has a tubular section 44 which is located on a guide surface 47 of a first hub means 48. The backing plate 38 has an annular ring 50 attached thereto for radially holding the internal bead 52 of the diaphragm 36 on ledge 54 of the first hub means 48. Threaded section 55 fastens a second hub means 46 to the first hub means 48 and in doing so acts on end 58 of the tubular section 44 to axially seal bead 52 against shoulder 60 on the first hub means 48.

The first hub means 48 has a housing 62 with a rearward projection which extends through the rear shell 30. The housing 62 has a first passage 64 which connects the front chamber 40 with axial bore 66. A second passage 68 located inwardly from a vacuum seat 70, which connects the axial bore 66 with the rear chamber 42. A third passage 72 connects the axial bore 66 with the atmosphere. The housing 62 has a rib 74 adjacent the end thereof for establishing an air above atmospheric pressure seat.

The second hub means 56 has an axial bore 76 with a concentric chamber 78. The chamber 78 is connected to a source 82 of air above atmospheric pressure through the entrance port 80 and conduit 84. The conduit 84 is coiled around return spring 87 to prevent interference upon movement of the wall means 37.

A first valve means 86 which is located in the axial bore 62 of the first hub means 48 consists of an annular poppet member 88 which is attached to a flexible tubular portion 90. The tubular portion 90 has a thickened end 92 which is fixed in the bore 66 by retainer 94. Thus, the poppet member 88 is free to move axially within the bore 66. A first spring 96 which is located between the poppet member 88 and stop 98 on push rod 100 urges the poppet member toward rib or vacuum seat 70 on the housing 62. A second spring 104 located between the retainer 94 and the stop 98 urges atmospheric seat 106 on the plunger means 108 toward the poppet member 88 to prevent air at atmospheric pressure from entering the second passage 68 in the first hub means 48.

The plunger means 108 has a cylindrical body 110 with a guide surface section 112 separated from the atmospheric seat section 106 by a shoulder 114. The cylindrical body has an axial bore 116 into which the spherical head 118 of the push rod 100 is retained. The guide surface section 112 extends into the axial bore 76 of the second hub means 56. A reaction hold-off means 120 is located on the guide surface 112 to prevent the shoulder 114 of the plunger means 108 from actuating the second valve means 128.

The reaction hold-off means 120 consists of a tubular block 122 of a deformable rubber. The tubular block 122 has a rib 124 adjacent the shoulder 114 with a slant face 126 for engaging the second valve means 128.

The second valve means 128 (see FIG. 2) is located in chamber 78 of the second hub means 56 to prevent air above atmospheric pressure from being communicated through the axial bore 66 to the second passage 68. The second valve means 128 includes a sleeve means 130 which has an inwardly projecting flange end 132 and an outwardly projecting flange end 134. The sleeve means 130 is carried on a bearing seal 136 which permits axial movement thereof. A spring 138 located in chamber 78 acts on the sleeve means 130 to urge the outward projecting flange 134 into a sealing relationship with rib 74.

A filter 132 is located on the push rod 100 between stop 98 and retainer means 135. The retainer means 135 has a series of varying length fingers 137 and 139 to positively retain the filter 144 within the bore 66 without effecting the communication of air at atmospheric pressure from the third passage 72 to the second passage 68.

A boot means 140 has an external bead 142 which snaps into a groove 133 in the housing 62. A cap 146 is crimped onto the bead to positively retain the same in groove 133. An internal bead 148 is correspondingly positioned on the push rod 100. A skirt 150 extends from the external bead along the bore 66 past the third passage. The skirt 150 has a series of slits adjacent the third passage 72 to produce a check valve or flapper control valve. The flapper will allow air at atmospheric pressure to pass through the third passage 72 but will prevent air above atmospheric pressure from passing from bore 66 into the atmosphere.

MODE OF OPERATION OF THE PREFERRED EMBODIMENT

With the motor of the vehicle running, vacuum will be produced at the intake manifold 152. This vacuum will be communicated through conduit 154 into the front chamber 40 of the servomotor 14. This vacuum will evacuate any air present in the rear chamber by way of the second passage 68, bore 66, and first passage 64 to permit return spring 87 to hold the wall means 37 against the rear shell 30.

Upon the operator desiring to stop the vehicle, an input force is applied to brake pedal 26. This input force is transmitted into linear movement as the pedal 26 pivots on pin 156. Initial movement of the push rod 100 will position the poppet member 88 on the vacuum seat 70 to interrupt communication of vacuum from the front chamber 40 to the rear chamber by the first passage 64. Further movement of the push rod 100 will move the atmospheric seat 106 on plunger means 108 away from the poppet member 88 to allow air at atmospheric pressure to flow past flapper in the skirt 150 of the boot means 140 into bore 66 and into the rear chamber 42 by way of the second passage 68.

With air at atmospheric pressure in the rear chamber 42 and vacuum in the front chamber 40, a pressure differential will be created across the wall means 37. This pressure differential will develop an operational force which will be transmitted through the tubular section 44 axially into the second hub means 56. As the operational force increases, the wall means 37 will be correspondingly moved to relay an operational force through push rod 160 to actuate the master cylinder 16.

If the operational pressure differential between vacuum and air at atmospheric pressure is insufficient to produce an adequate braking force, further input will be applied to the brake pedal 26. This further input will move reaction hold-off means 120 into engagement with shoulder 162 of the second hub means 56. A portion of the input force applied to the brake pedal 26 will be absorbed in the tubular block 122. As the tubular block 122 is compacted it is also radially expanded and will engage the inwardly projecting flange 132. As the tubular section decreases in axial dimension the radial dimension is proportionately increased, see FIG. 3. The flange 132 will be picked up and moved as the tubular section 122 is compressed. The movement of flange 134 away from seat 74 to allow air above atmospheric pressure to enter the first bore 66 and pass into the rear chamber 42 through the second passage 68. The air above atmospheric pressure will act on flapper in skirt 150 to seal passage 72 and prevent the air above atmospheric pressure from escaping into the atmosphere.

With air above atmospheric pressure in the rear chamber 42 and vacuum in the front chamber 40, an operational pressure differential will be created to move the wall means 37 and operate the brake actuator.

Upon termination of the input force on the brake pedal, spring 138 will seat flange 134 on seat 74; spring 96 will hold the poppet 88 on atmospheric seat 106, and spring 104 will move the push rod 100 and attached plunger means 108 rearwardly until shoulder 114 engages ledge 115 on the housing 62. In this position vacuum available in the front chamber 40, will evacuate air from the rear chamber 42 to permit return spring 86 to move wall means 37 into contact with the rear shell 30.

In case of a panic stop, when the operator applies a rapid input to the brake pedal 26, the reaction hold-off means 120 will absorb a portion of the input force to permit air at atmospheric pressure to enter into the rear chamber 42. In this manner, the second valve means 128 will not be activated until such time that the pressure differential between vacuum and air at atmospheric pressure is established.

We claim:

1. In a servomotor having a pressure responsive wall means for separating a front chamber from a rear chamber with a control means for sequentially presenting air at atmospheric pressure and air above atmospheric pressure from a source to the pressure responsive wall means to establish a pressure differential between the front chamber and the rear chamber for moving the pressure responsive wall means to produce an output force, and for delaying the communication of said air above atmospheric pressure to the pressure responsive wall means until a predetermined output force is developed from said air at atmospheric pressure, said control means comprising:

first hub means connected to said wall means having a rearward axial projection which extends through the rear chamber into the atmosphere, said rearward axial projection having a first axial bore with a first passage, a second passage and a third passage, said first passage being in communication with said front chamber, said second passage being in communication with the rear chamber and a third passage in communication with air at atmospheric pressure, said first axial bore having a first shoulder which separates the first passage from the second passage, said first shoulder having a first face adjacent the first passage and a second face adjacent the end of the first hub means, said first hub means having an annular horizontal projection extending from adjacent the first shoulder;

second hub means attached to said first hub means for holding the wall means in a fixed relationship with said first hub means, said second hub means having a second axial bore concentric to said first axial bore, said second hub means having a third axial bore concentric to and separated from said second axial bore by a second shoulder, said third axial bore having a fourth passage in communication with air above atmospheric pressure;

plunger means having a cylindrical body with first surface located in said second axial bore, a second surface having a peripheral surface substantially equal to the first axial bore and a third surface having a peripheral surface smaller than said first shoulder in the first axial bore, said cylindrical body having a spherical recess for retaining an input rod from an actuator, said plunger means having a third shoulder between the first and second surfaces on the cylindrical body;

first valve means located in said axial bore for regulating the communication between the first passage and the first axial bore;

first resilient means for urging said first valve means into contact with said third surface of the plunger means to permit vacuum present in the front chamber to be communicated to the rear chamber through the first and second passages;

second valve means located in said third axial bore for regulating the communication between the fourth passage and the first axial bore;

second resilient means for urging said second valve means into contact with said annular horizontal projection to prevent communication of air above atmospheric pressure into the first bore;

third resilient means for urging said push rod and attached plunger means toward said first valve means and for positioning said second surface of the plunger means on the second face of the first shoulder of the first hub means;

check valve means associated with the first axial bore to prevent communication of air above atmospheric pressure to the atmosphere through the third passage; and deformable means connected to said plunger means and normally disengaged from said second valve means for radially expanding and axially compressing as a function of input force to output force to proportionally engage and actuate said second valve means to allow air above atmospheric pressure to be presented to said pressure responsive wall means.

2. In the servomotor, as recited in claim 1, wherein said deformable means includes:

a tubular body located on said first surface of the plunger means, said tubular body being axially compressed between said second shoulder on the second hub means and said third shoulder on the plunger means to produce the radial expansion for actuation of the second valve means.

3. In the servomotor, as recited in claim 2, wherein said deformable means includes:

a rib located on said tublar body adjacent said third shoulder having a sloping face thereon extending the second shoulder for establishing an axial component from said radial expansion to accelerate the actuation of said second valve means.

4. In the servomotor, as recited in claim 3, wherein said push rod means sequentially moves from a rest position to a first position, to permit the first resilient means to seat the first valve means on the first face and prevent vacuum communication through the first passage to the first axial bore, from the first position to a second position to permit air at atmospheric pressure to be communicated through said check valve means into the rear chamber to establish an operational pressure differential, from the second position to a third position to bring the tubular body of the deformable means into contact with the second shoulder of the second hub means and from a third position to a fourth position to develop said radial expansion for actuating the second valve means for response to an input force.

5. In a servomotor having control means for sequentially presenting air at atmospheric pressure and air above atmospheric pressure to a pressure responsive wall means to establish a pressure differential between a front chamber and a rear chamber which will move the wall means and create an output force, said control means comprising:

first hub means having a first axial bore with a first passage connected to the front chamber, a second passage connected to the rear chamber, and a third passage connected to the atmosphere;

second hub means attached to the first hub means having a second axial bore extending from the first axial bore, and a fourth passage connecting the first axial bore with a source of air above atmospheric pressure;

plunger means having a cylindrical body with a guide surface located in said second axial bore, said guide surface being separated from an atmospheric seat surface by a shoulder;

first valve means located in said first axial bore for regulating the communication of vacuum between the front chamber and the axial bore through the first passage;

second valve means located in said fourth passage for regulating the communication of air above atmospheric pressure into the first axial bore;

resilient means normally disengaged from said second valve means and located on said guide surface of the plunger means adjacent said shoulder for delaying the actuation of said second valve means until a predetermined reactive force is developed between an input force and said output force;

check valve means connected to said third passage for preventing air above atmospheric pressure from being communicated to the atmosphere from the first axial bore; and push rod means responsive to said input force for moving said plunger means which actuates said first valve means to interrupt the vacuum communication through the first passage and permit air at atmospheric pressure to enter the rear chamber through the second passage and establish said pressure differential, said push rod means further moving said plunger means causing said resilient means to engage the second hub means, saiad resilient means upon the engagement with the second hub means resisting the movement of the plunger means as a function of the output force created by the pressure differential across the pressure responsive wall means by radially expanding and axially compressing to engage and actuate the second valve means and permit air above atmospheric pressure to proportionally enter the rear chamber through the second passage and establish the pressure differential.

6. In the servomotor, as recited in claim 5, wherein said resilient means includes:

a tubular body located on said guide surface whose peripheral dimension is proportionally increased with an axial dimension decrease in response to being compressed by opposing the movement of the plunger means.

7. In the servomotor, as recited in claim 6, wherein said resilient means further includes:

a rib located on the tubular body adjacent the shoulder of the plunger having a sloped face thereon to provide an axial and radial force for actuating the second valve means.

* * * * *